United States Patent [19]
Hirano

[11] 3,904,953
[45] Sept. 9, 1975

[54] COIL ARRANGEMENT OF AN ELECTRICAL EQUIPMENT WHEREIN A COMPENSATING IMPEDANCE PROVIDES UNIFORM DISTRIBUTION OF INTERNAL IMPEDANCE AND CURRENT

[75] Inventor: Ikuro Hirano, Tokyo, Japan

[73] Assignee: Kabushiki Kaisha Meidensha, Tokyo, Japan

[22] Filed: May 28, 1974

[21] Appl. No.: 474,105

[30] Foreign Application Priority Data
May 29, 1973 Japan.............................. 48-63066

[52] U.S. Cl.................. 323/44 R; 307/92; 323/48; 323/61; 336/182
[51] Int. Cl.².................... H02M 5/10; H02P 13/04
[58] Field of Search............. 323/44 R, 48, 49, 50, 323/60, 61; 336/170, 180, 181, 182; 307/17, 92; 321/27

[56] References Cited
UNITED STATES PATENTS

| | | | |
|---|---|---|---|
| 2,856,577 | 10/1958 | Schmidt, Jr. | 321/27 R |
| 3,042,849 | 7/1962 | Dortort | 321/27 R |
| 3,363,169 | 1/1968 | Nicoletti | 323/44 R |
| 3,601,690 | 8/1971 | Judson et al. | 307/17 X |

*Primary Examiner*—Gerald Goldberg
*Attorney, Agent, or Firm*—Haseltine, Lake & Waters

[57] ABSTRACT

An improved coil arrangement for use in a large-current electrical induction equipment such as a transformer and a reactor comprising a secondary coil unit consisting of a plurality of separate windings which are in mutually neighbouring relation in an axial direction of the secondary coil unit and which are electrically connected in parallel to a common bus line. The internal impedances of all the windings of the secondary coil unit are equalized with one another by an impedance compensating element connected between the bus line and each of the windings located at axial ends of the secondary coil unit. The impedance compensating element is configured to involve no helical turns and to exhibit a reactance which is proportional to the number of lines of leakage flux which links with the element.

4 Claims, 6 Drawing Figures

LEAKAGE FLUX

AXIS OF HELIX

LEAKAGE FLUX

AXIS OF HELIX

CURRENTS THRU WINDINGS

AXIS OF HELIX

COIL ARRANGEMENT OF AN ELECTRICAL EQUIPMENT WHEREIN A COMPENSATING IMPEDANCE PROVIDES UNIFORM DISTRIBUTION OF INTERNAL IMPEDANCE AND CURRENT

The present invention relates to coil arrangements of electrical induction equipment such as transformers and reactors.

Various types of coil arrangements are presently in use for providing various electrical characteristics, mechanical strengths and cooling efficiencies depending upon the performance characteristics of electrical equipment into which the coil arrangements are to be incorporated. The coil arrangement to which the present invention is directed is of the type which is typically used in a large-current transformer or reactor and which has a secondary coil unit consisting of a number of separate windings. The separate secondary windings are connected in parallel to common bus lines and are mounted on a primary winding unit in axially neighbouring relation to each other. In the coil arrangement of this nature, a smaller number of lines of leakage flux links with each of the windings located at axial ends of the secondary coil unit than that of the leakage flux linking with each of the remaining ones of the secondary coil unit and, as a consequence, each of the windings at the axial ends of the coil unit has an internal impedance which is extremely lower than that of each of the remaining windings. It therefore follows that currents several times larger than those flowing in the remaining windings flow in the windings at the axial ends of the secondary coil unit so that the windings at the axial ends tend to be overheated by such large currents. A current-limiting reactor is therefore connected between each of the windings at the axial ends of the secondary coil unit and the bus line so that the internal impedances of all the secondary windings are equalized. The current-limiting reactors used for this purpose are usually of the air-core or iron-core type and must be positioned separately of the coil arrangement. Complicated wiring arrangements are therefore necessitated for connecting the current-limiting reactors to the axial-end windings of the secondary coil unit and, on top of this, the space requirement for the accommodation of the reactors in the electrical induction equipment becomes an important consideration which is causative of an enlarged overall construction of the induction equipment. The present invention contemplates provision of an improved coil arrangement which is free from these problems which have thus far been inherent in the prior art coil arrangement of the described character.

It is, therefore, an object of the present invention to provide a coil arrangement featuring uniform distribution of internal impedance and current throughout the windings which constitute the secondary winding unit of the coil arrangement.

It is another object of the invention to provide a coil arrangement having a compact and small sized construction which will not create serious space requirements in electrical induction equipment incorporating the coil arrangement.

In accordance with the present invention, these and other objects will be generally accomplished in a coil arrangement comprising a primary coil unit, a secondary coil unit which consists of a plurality of separate windings which are positioned in neighbouring relation in an axial direction of the secondary coil unit and which are electrically connected in parallel to a common bus line, and an impedance compensating element which is connected between the bus line and each of the windings located at axial ends of the secondary coil unit and which is devoid of any helical turns for substantially equalizing internal impedances of all the windings of the secondary coil unit.

The features and advantages of the improved coil arrangement according to the present invention will become more apparent from the following description taken in conjunction with the accompanying drawings, in which.

Figure 3:
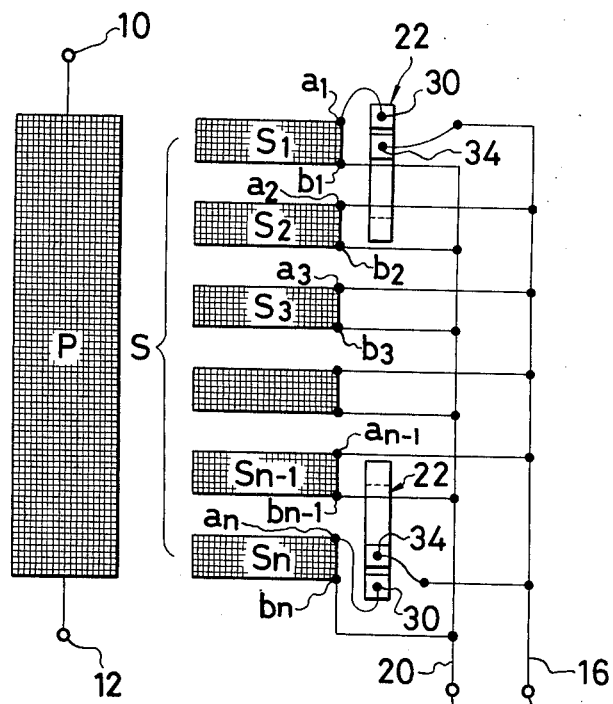
FIG. 3 is a longitudinal sectional view of a diametrical half of an embodiment of the coil arrangement according to the present invention.
Figure 5:
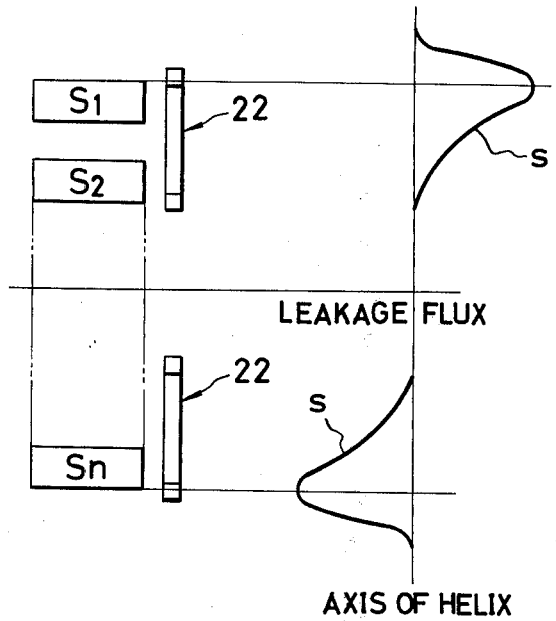
Figure 6:
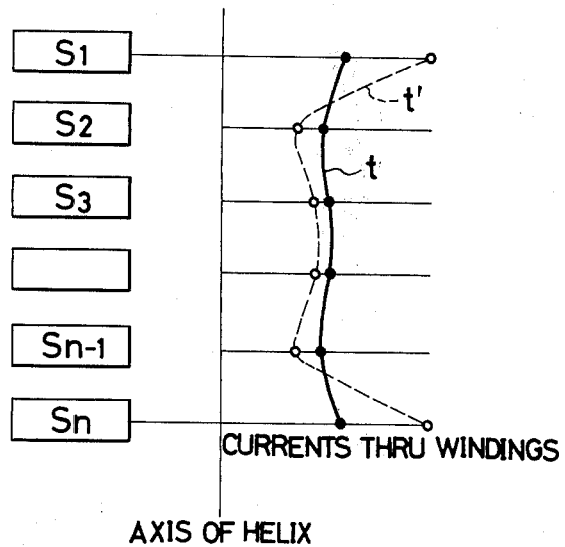

FIG. 5 is a graph which indicates the distribution of the leakage flux linking in a radial direction of the secondary coil unit with the windings of the coil unit in the coil arrangement illustrated in FIG. 3; and FIG. 6 is a graph which indicates the distribution of current in the windings of the secondary coil units of the coil arrangement according to the present invention and of a coil arrangement which is devoid of the compensating means which is provided in accordance with the present invention.

Figure 1:
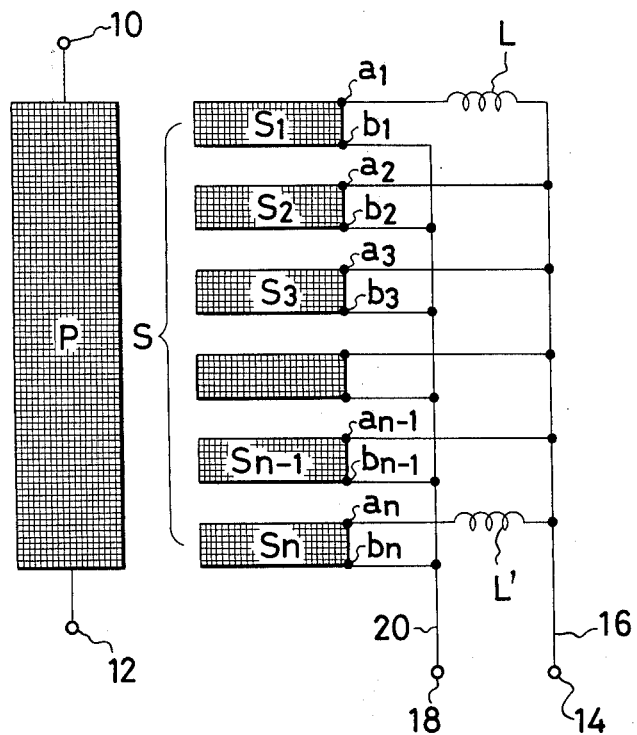
FIG. 1 is a longitudinal sectional view of a diametrical half of a prior art coil arrangement of the described type.

Referring to the drawings, first to FIG. 1, the prior art coil arrangement for use in a large-current transformer or reactor comprises a primary coil unit P consisting of a winding (not shown) wrapped around a core (not shown) into a generally cylindrical configuration and electrically connected at its ends to input terminals 10 and 12 and a secondary coil unit S which consists of a plurality of separate windings $S_1, S_2, S_3, \ldots, S_{n-1}$ and $S_n$ which are wrapped on the primary coil unit P into generally ring forms in neibouring relation to each other in an axial direction of the secondary coil unit S. The windings $S_1, S_2, S_3, \ldots, S_{n-1}$ and $S_n$ are assumed to have the same number of turns. The separate secondary windings $S_1, S_2, S_3, \ldots, S_{n-1}$ and $S_n$ respectively have first ends $a_1, a_2, a_3, \ldots, a_{n-1}$ and $a_n$ connected in parallel to a first output terminal 14 through a bus line 16 and second ends $b_1, b_2, b_3, \ldots, b_{n-1}$ and $b_n$ connected in parallel to a second output terminal 18 through a bus line 20. Current-limiting reactors L and L' are connected between the bus line 16 and the first ends $a_1$ and $a_n$ of the windings $S_1$ and $S_n$ located at axial ends of the secondary coil unit S for the purpose of equalizing the currents to flow in the individual windings, $S_1, S_2, S_3, \ldots, S_{n-1}$ and $S_n$ as previously mentioned.

Figure 2:
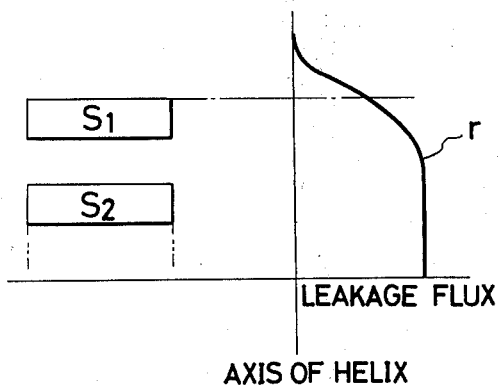
FIG. 2 is a graph which indicates the distribution of the leakage flux linking in an axial direction of the secondary coil unit with the windings of the coil unit in a coil arrangement which is devoid of the current-limiting reactors.

Unless the current-limiting reactors L and L' are connected to the windings $S_1$ and $S_n$ at the axial ends of the secondary coil unit S, a smaller number of lines of leakage flux links with each of the windings $S_1$ and $S_n$ than that of the leakage flow linking with each of the remaining or axially intermediate windings $S_2, S_3, \ldots, S_{n-1}$ as will be seen from curve $r$ of FIG. 2. This results in lower internal impedances of the windings $S_1$ and $S_n$ than those of the remaining windings $S_2, S_3, \ldots, S_{n-1}$. Currents several times larger than those flowing in the windings $S_2, S_3, \ldots, S_{n-1}$ therefore flow through the windings $S_1$ and $S_n$ at the axial ends of the secondary coil unit S so that heat will be generated in the windings $S_1$ and $S_n$ in amounts which are proportional to the squares of the currents flowing in the windings. The windings $S_1$ and $S_n$ located at the axial ends of the secondary coil unit S thus tend to be overheated.

If the current limiting reactors L and L' are connected to the windings $S_1$ and $S_n$, respectively, and if each of the reactors L and L' has a reactance which is equal to the difference between a leakage reactance which is produced by an axial leakage flux to link with each of the axially intermediate windings $S_2, S_3, \ldots, S_{N-1}$ and a leakage reactance which is produced by an axial leakage flux to link with each of the axial-end windings $S_1$ and $S_n$, then the internal impedances of the windings $S_1, S_2, S_3, \ldots, S_{n-1}$ and $S_n$ of the secondary coil unit S can be substantially equalized with one another so that substantially equalized current will flow in all the windings of the secondary coil unit S. As previously pointed out, however, problems have thus far been encountered in the coil arrangement using the current-limiting reactors because of the fact that the reactors are of the air-core or iron-core type which must be positioned separately from the coil arrangement. Positioning the reactors separately from the coil arrangement necessitates complicated wiring arrangement for the connection of the reactors to the secondary coil unit of the coil arrangement and additional spaces for the accommodation of the reactors in the electrical induction equipment into which the coil arrangement is to be incorporated. The goal of the present invention is to provide a useful and economical solution to these problems which have been inherent in the prior art coil arrangement of the type using the current-limiting reactors of the air-core or iron-core designs.

To achieve such a goal, the secondary coil unit S of the coil arrangement embodying the present invention comprises, as illustrated in FIG. 3, an impedance compensating element 22 which is connected between each of the windings $S_1$ and $S_n$ located at the axial ends of the secondary coil unit S and the bus line 16 through which the windings $S_1, S_2, S_3, \ldots, S_n$ of the secondary coil unit S are connected in parallel to the terminal 14. More specifically, the impedance compensating element 22 associated with the winding $S_1$ located at one axial end of the secondary coil unit S is connected at one end to the first end $a_1$ of the winding $S_1$ and at the other end to the bus line 16 and, likewise, the impedance compensating element 22 associated with the winding $S_n$ located at the other axisl end of the secondary coil unit S is connected at one end to the first end $a_n$ of the winding $s_n$ and at the other end to the bus line 16. The impedance compensating element 22 thus connected between each of the axial-end windings $S_1$ and $S_n$ of the secondary coil unit S and the bus line 16 is so arranged as to involve no helical turns and exhibits a reactance which is in direct proportion to the number of lines of linkage flux to link with the element. A preferred configuration of the impedance compensating element arranged in this manner is illustrated in FIG. 4.

Figure 4:
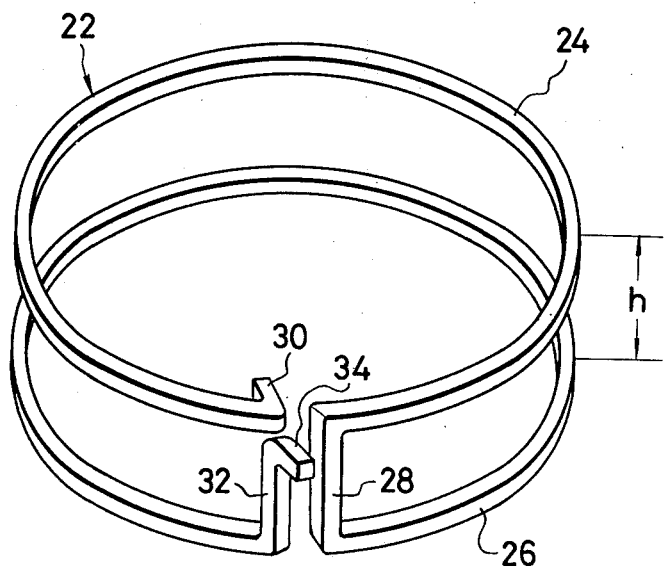
FIG. 4 is a perspective view which shows a preferred embodiment of the compensating means incorporated into the embodiment of the coil arrangement illustrated in FIG. 3.

Referring to FIG. 4, the impedance compensating element 22 comprises axially spaced parallel first and second ring-shaped portions 24 and 26 which are substantially equal in diameter and which have circumstantially spaced ends which are substantially in alignment with each other in directions parallel to a common axis of the ring-shaped portions 24 and 26, and an axial portion 28 which extends substantially in parallel to the common axis of the ring-shaped portions 24 and 26 and through which the ring-shaped portions 24 and 26 are connected to each other at one end of each of the portions. The first ring-shaped portion 24 has its other end a radially inwardly bent portion 30, whereas the second ring-shaped portion 26 is connected at the other end to a second axial portion 32 which extends substantially in parallel to the axial portion 28 toward the first axial portion 24 and which has a leading end portion 34 which is radially outwardly bent. The impedance compensating element 22 being thus configured, no helical turns are involved therein so that, when such an element is connected to a coil, the number of turns of the coil will remain unchanged although a leakage reactance which is proportional to the number of lines of leakage flux to link with the element will be produced by a load current flowing in the element. As schematically illustrated in FIG. 3, the radially inwardly bent end portion 30 of the first ring-shaped portion 24 is electrically connected to the first end $a_1$ or $a_n$ of the windings $S_1$ or $S_n$, respectively, of the secondary coil unit S and the radially outwardly bent end portion 34 of the second axial portion 32 is electrically connected to the bus line 16.

Turning back to FIG. 4, the first and second ring-shaped portions 24 and 26 of the impedance compensating element 22 are axially spaced apart from each other by a distance $h$. The distance $h$ is selected in such a manner as to enable the compensating element 22 to produce a reactance which is proportional to the number of lines to link with the compensating element and which is substantially equal to the difference between a leakage reactance to be produced by an axial leakage to link with each of the axially intermediate windings $S_2, S_3, \ldots, S_{n-1}$ of the secondary coil unit S and a leakage reactance to be produced by an axial leakage flux to link with each of the windings $S_1$ and $S_n$ located at the axial ends of the secondary coil unit S. If, thus, the leakage reactance produced by the axial leakage flux to link with the windings $S_1$ or $S_n$ located at the axial end of the secondary coil unit S is represented by $Xe$ and the leakage reactance produced by the axial leakage flux to link with one of the remaining windings $S_2, S_3, \ldots, S_{n-1}$ of the secondary coil unit S is represented by $Xi$, then the reactance X which should be possessed by the impedance compensating element 22 is given by:

$$X = Xi - Xe.$$

With the impedance compensating elements 22 arranged in the above described manner, the radial leakage flux of the secondary coil unit S peaks at the axial ends of the secondary coil unit S as will be seen from curve $s$ of FIG. 5. The reactance of each of the impedance compensating elements 22 is in direct proportion to the leakage flux to link with the compensating element so that substantially equalized internal impedances will be achieved by all the windings $S_1, S_2, S_3, \ldots, S_{n-1}$ and $S_n$ of the secondary coil unit S and accordingly substantially equalized currents will flow in the windings $S_1, S_2, S_3, \ldots, S_{n-1}$ and $S_n$ when the primary coil unit P is energized from an external power source. This will be clearly ascertained by comparison in FIG. 6 between a curve $t$ which is indicative of the current distribution among the windings $S_1, S_2, S_3, \ldots, S_{n-1}$ and $S_n$ of the secondary coil unit provided with the impedance compensating elements 22 and a curve $t'$ which is indicative of the current distribution in a secondary coil unit which is devoid of the impedance compensating elements.

It will now be appreciated from the foregoing description that the coil arrangement according to the present invention will provide the following advantages over the prior art coil arrangements using the current-limiting reactors:

a. Simple and compact construction of the impedance compensating element which can be readily and economically manufactured on a commercial basis.

b. Only limited space required for the installation of the impedance compensating elements, because of the small-sized configurations of the elements.

c. No complicated wiring arrangement required to connect the impedance compensating elements to the secondary coil unit because the impedance compensating elements need not be positioned separately from the coil arrangement.

d. Small-sized construction allowable for electrical equipment which is to incorporate the coil arrangement, because of the limited space required for the installation of the impedance compensating arrangement and the simplified wiring arrangement for connecting the compensating elements to the secondary coil unit and because of the fact that the impedance compensating elements can be compactly incorporated into the coil arrangement per se.

e. Since substantially equalized currents flow through the windings of the secondary coil unit and the impedance compensating elements, the compensating elements can be formed of conductors having cross sectional areas which are substantially equal to those of the conductors forming the windings.

f. Reduced production cost of the coil arrangement, achieved by virtue of the advantages under items $a$ to $e$.

g. Substantially equalized current flow in all the windings of the secondary coil unit so that overheat of the secondary coil unit can be prevented.

What is claimed is:

1. A coil arrangement for electrical induction equipment, comprising a primary coil unit, a secondary coil unit including a plurality of separate windings which are positioned in neighboring relation to each other in an axial direction of the secondary coil unit and which are electrically connected in parallel to a common bus line, and an impedance compensating element connected between said bus line and each of the windings located at axial ends of the secondary coil unit, said impedance compensating element comprising axially spaced parallel first and second ring-shaped portions which are substantially identical in diameter and which have circumferentially spaced ends which are substantially in alignment with each other in the axial direction of the secondary coil unit, a first axial portion which extends in the axial direction of the secondary coil unit and through which the first and second ring-shaped portions are connected together at one end of each of the ring-shaped portions, and a second axial portion which extends substantially in parallel to said first axial portion from the other end of the second ring-shaped portion toward the first ring-shaped portion, said first ring-shaped portion having a free end portion electrically connected to the associated winding of the secondary coil unit and said second axial portion having a free end portion electrically connected to said bus line.

2. A coil arrangement as set forth in claim 1, in which said first and second ring-shaped portions are axially spaced apart from each other a distance which is selected to enable the impedance compensating element to produce a reactance which is substantially equal to the difference between a leakage reactance produced by an axial leakage flux to link with each of the windings located at the axial ends of the secondary coil unit and a leakage reactance produced by an axial leakage fluid to link with each of the remaining windings of the secondary coil unit.

3. A coil arrangement as set forth in claim 1, in which said free end portion of the first ring-shaped portion is bent radially inwardly and said free end portion of said second axial portion is bent radially outwardly.

4. A coil arrangement as set forth in claim 1, in which said ring-shaped portions have a sectional area which is substantially equal to the sectional area of a conductor forming each of said windings of the secondary coil unit.

* * * * *